US012710620B2

(12) United States Patent
Nishio et al.

(10) Patent No.: US 12,710,620 B2
(45) Date of Patent: Aug. 18, 2026

(54) LASER APPARATUS AND LASER MACHINING APPARATUS USING SAME

(71) Applicant: Panasonic Intellectual Property Management Co., Ltd., Osaka (JP)

(72) Inventors: Masatoshi Nishio, Osaka (JP); Manabu Nishihara, Osaka (JP); Yoshinori Sasaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1031 days.

(21) Appl. No.: 17/809,023

(22) Filed: Jun. 27, 2022

(65) Prior Publication Data

US 2022/0326478 A1 Oct. 13, 2022

Related U.S. Application Data

(63) Continuation of application No. PCT/JP2021/000963, filed on Jan. 14, 2021.

(30) Foreign Application Priority Data

Jan. 15, 2020 (JP) ................................ 2020-004767

(51) Int. Cl.
*G02B 7/182* (2021.01)
*B23K 26/042* (2014.01)
(Continued)

(52) U.S. Cl.
CPC .......... *G02B 7/1827* (2013.01); *B23K 26/043* (2013.01); *G02B 26/0816* (2013.01); *G02B 6/262* (2013.01)

(58) Field of Classification Search
CPC .. B23K 26/043; B23K 26/703; B23K 26/082; B23K 26/32; B23K 26/24; B23K 26/28;
(Continued)

(56) References Cited

U.S. PATENT DOCUMENTS 6,664,507 B2 * 12/2003 Akaba ................ B23K 26/0608 219/121.63
2005/0161445 A1 * 7/2005 Ishii ..................... B23K 26/043 356/152.1
(Continued)

FOREIGN PATENT DOCUMENTS

CN 101868887 10/2012
JP 60-130935 7/1985
(Continued)

OTHER PUBLICATIONS

International Search Report of PCT application No. PCT/JP2021/000963 dated Apr. 13, 2021.
(Continued)

*Primary Examiner* — Phuong T Nguyen
(74) *Attorney, Agent, or Firm* — Wenderoth, Lind & Ponack, L.L.P.

(57) ABSTRACT

Laser apparatus (10) includes at least: a laser oscillator that emits laser light (LB); reflection mirrors (M1), (M2) that are disposed on an optical path of laser light (LB) and change the optical path; actuators (ACT1), (ACT2) that are respectively coupled to reflection mirrors (M1), (M2) and displace reflection mirrors (M1), (M2); optical axis deviation detector (16) that is disposed to surround the optical path of laser light (LB) and detects an optical axis deviation of laser light (LB); and a controller that drives actuators (ACT1), (ACT2) on the basis of a detection result of optical axis deviation detector (16) to displace reflection mirrors (M1), (M2) and correct the optical axis deviation of laser light (LB).

10 Claims, 8 Drawing Sheets

(51) Int. Cl.
*G02B 26/08* (2006.01)
*G02B 6/26* (2006.01)

(58) Field of Classification Search
CPC ............... B23K 26/22; B23K 26/0622; B23K 2101/18; B23K 2101/006; B23K 26/323; B23K 26/044; B23K 2203/04; B23K 26/26; B23K 26/244; B23K 26/14; B23K 31/125; B23K 26/20; B23K 26/0066; G02B 7/1827; G02B 26/0816; G02B 6/262
USPC ................. 219/92, 121.63, 121.64, 136, 119
See application file for complete search history.

(56) References Cited

U.S. PATENT DOCUMENTS

| | | | | |
|---|---|---|---|---|
| 2006/0043077 | A1* | 3/2006 | Nittner ................ | B23K 26/702 219/121.75 |
| 2006/0202115 | A1 | 9/2006 | Lizotte et al. | |
| 2012/0121749 | A1 | 5/2012 | Sakai et al. | |
| 2021/0060696 | A1 | 3/2021 | Ishikawa et al. | |

FOREIGN PATENT DOCUMENTS

| | | |
|---|---|---|
| JP | 62-71288 | 4/1987 |
| JP | 63-171283 | 7/1988 |
| JP | 1-113191 | 5/1989 |
| JP | 11-274614 | 10/1999 |
| JP | 11-275022 | 10/1999 |
| JP | 2003-295075 | 10/2003 |
| JP | 2010-207879 | 9/2010 |
| JP | 2011-115806 | 6/2011 |
| JP | 2019-192757 | 10/2019 |
| WO | 2009/066918 | 5/2009 |
| WO | 2011/013666 | 2/2011 |
| WO | 2019/221034 | 11/2019 |

OTHER PUBLICATIONS

Extended European Search Report issued Jul. 13, 2023 in corresponding European Patent Application No. 21741430.9.
Communication pursuant to Article 94(3) EPC dated Jan. 15, 2026 in corresponding European Patent Application No. 21741430.9.

* cited by examiner

LA
30
32
32
31
16
16
33
33
10
15b
15c
15
FL
LB1
15a
13
LI
LO
14a
14
ACT2
M2
LB
LA
M1
ACT1
X
Y
Z

LB,LA
30
32
32
31
10
15b
15c
15
FL
15a
LB1
13
16
16
LI
LO
14a
14
ACT2
M2
GP
ACT4
LB,LA
M1
ACT1
X
Y
Z

LASER APPARATUS AND LASER MACHINING APPARATUS USING SAME

This application is a continuation of the PCT International Application No. PCT/JP2021/000963 filed on Jan. 14, 2021, which claim the benefit of foreign priority of Japanese patent application No. 2020-004767 filed on Jan. 15, 2020, the contents all of which are incorporated herein by reference.

TECHNICAL FIELD

The present disclosure relates to a laser apparatus and a laser machining apparatus using the same.

BACKGROUND ART

Conventionally, laser apparatuses that emit laser light have been widely used in fields such as optical communication and material machining. In many cases, in order to illuminate a desired position with laser light, a laser apparatus is provided with a mechanism for adjusting an optical axis of the laser light.

For example, Unexamined Japanese Patent Publication No. H11-275022 (hereinafter, JP '022) discloses an optical transceiving module including a lens that optically couples laser light to a core of a transmission fiber, a beam splitter, and a multi-split light receiver. In this module, reflected light reflected by an end surface of the transmission fiber is made incident on the multi-split light receiver using the beam splitter, and an actuator is driven on the basis of an output signal from each dividing unit of the light receiver to adjust a position of the lens such that an optical axis of the laser light coincides with the core of the transmission fiber.

However, laser light used for laser machining or the like has a large output power, and in a case where the laser light deviates from the core and enters cladding of the transmission fiber, the incident surface of the transmission fiber is damaged. For this reason, it is difficult to correct an optical axis deviation of the laser light by the configuration disclosed in JP '022.

The present disclosure has been made in view of such a point, and an object of the present disclosure is to provide a laser apparatus capable of correcting an optical axis deviation of high-output power laser light with a simple configuration, and a laser machining apparatus using the laser apparatus.

SUMMARY OF THE INVENTION

In order to achieve the above object, a laser apparatus according to the present disclosure includes at least: a laser oscillator that emits laser light; an optical path changing component that is disposed on an optical path of the laser light and changes the optical path of the laser light;

an actuator that is coupled to the optical path changing component and displaces the optical path changing component; an optical axis deviation detector that is disposed to surround the optical path of the laser light and detects an optical axis deviation of the laser light; and a controller that drives the actuator based on a detection result of the optical axis deviation detector to displace the optical path changing component and correct the optical axis deviation of the laser light.

According to this configuration, it is possible to correct the optical axis deviation of high-output power laser light with a simple configuration.

A laser machining apparatus according to the present disclosure includes at least: the laser apparatus; a transmission fiber that transmits the laser light emitted from the laser apparatus; and a laser processing head that is attached to an emission end of the transmission fiber and illuminates the laser light toward a workpiece.

According to this configuration, a machining point of the workpiece can be accurately illuminated with the laser light, and the machining quality of the workpiece can be improved. Further, since the optical axis of the laser light can be accurately aligned with the core of the transmission fiber, damage to the transmission fiber can be suppressed.

Advantageous Effects of Invention

According to the laser apparatus of the present disclosure, it is possible to correct the optical axis deviation of the high-output power laser light with a simple configuration. Further, according to the laser machining apparatus of the present disclosure, the machining quality of the workpiece can be improved, and the damage of the transmission fiber can be suppressed.

DETAILED DESCRIPTION OF THE INVENTION

Hereinafter, exemplary embodiments of the present disclosure will be described in detail with reference to the drawings. The following description of preferable exemplary embodiments is merely illustrative in nature and is not intended to limit the present disclosure, application thereof, or use thereof.

First Exemplary Embodiment

[Configuration of Laser Machining Apparatus]

Figure 1:
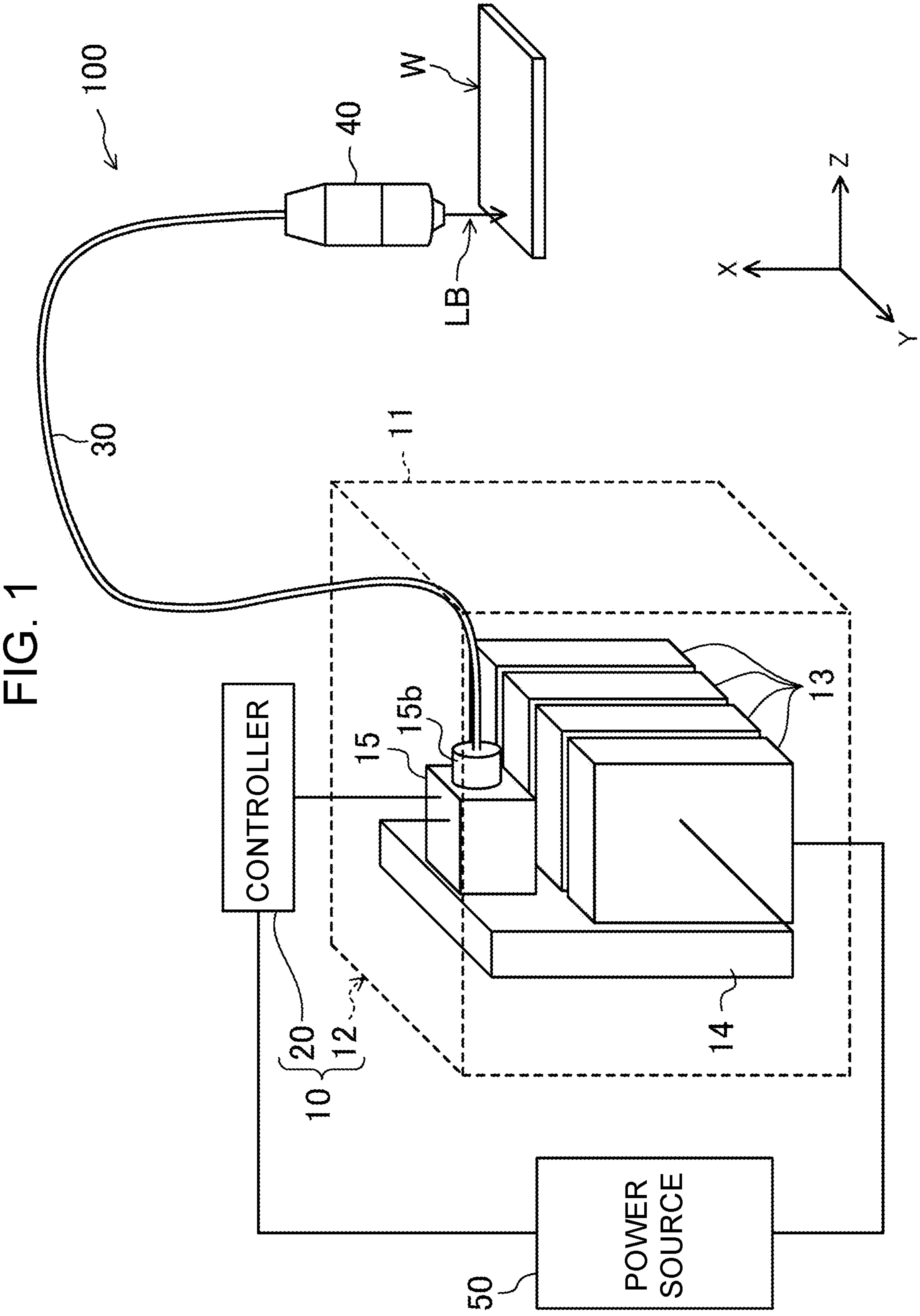
FIG. 1 is a schematic diagram illustrating a configuration of a laser machining apparatus according to a first exemplary embodiment of the present disclosure.

FIG. 1 is a schematic diagram of a configuration of a laser machining apparatus according to the present exemplary embodiment, and laser machining apparatus 100 includes laser apparatus 10, transmission fiber 30, laser processing head 40, and power supply 50. Note that laser processing head 40 that illuminates laser light LB toward workpiece W may be attached to a manipulator (not illustrated). In this case, the manipulator is connected to a robot controller (not illustrated), and moves laser processing head 40 so as to draw a predetermined trajectory according to a laser machining program.

Note that in the following description, an arrangement direction of laser modules 13 in FIG. 1 may be referred to as a Y-direction, a direction from condensing optical unit 15 toward transmission fiber 30 may be referred to as a Z-direction, and a direction orthogonal to an X-direction and the Z-direction may be referred to as the Y-direction.

Laser apparatus 10 includes laser oscillator 12 and controller 20, and laser oscillator 12 is accommodated in housing 11. Further, optical axis deviation detector 16, reflection mirrors M1, M2, and actuators ACT1, ACT2, which will be described later, are disposed inside laser oscillator 12. Furthermore, an end part (Hereinafter, it is simply referred to as an incident end) of transmission fiber 30 on which laser light LB is incident from laser oscillator 12 is accommodated in housing 11. Note that an end part of transmission fiber 30 from which laser light LB is emitted is hereinafter simply referred to as an emission end.

Laser oscillator 12 includes a plurality of laser modules 13 functioning as laser light sources, beam combiner 14, and condensing optical unit 15. Laser modules 13 include a plurality of laser diodes or laser diode arrays that emit laser beams having different wavelengths, and laser light (Hereinafter, it may be referred to as module laser light) synthesized by the wavelengths in laser modules 13 is emitted from each of laser modules 13.

Beam combiner 14 includes housing 14*a*, a plurality of reflection mirrors including reflection mirrors M1, M2 disposed inside the housing, and a plurality of actuators including actuators ACT1, ACT2. The plurality of reflection mirrors are disposed on optical path LP (see FIG. 3) of a mode component necessary for machining in laser light LB, and are optical path changing components for directing laser light LB toward condensing optical unit 15. The plurality of actuators are coupled to the respective reflection mirrors (see FIG. 2). The operations of reflection mirrors M1, M2 and actuators ACT1, ACT2 will be described later.

Beam combiner 14 couples module laser lights emitted from the plurality of laser modules 13 to laser light LB, and emits the module laser lights to condensing optical unit 15. Specifically, the optical axes of the respective module laser lights are brought close to or coincide with each other, and the module laser lights are coupled so that the optical axes are parallel to each other.

Condensing optical unit 15 includes housing 15*a*, and condensing lens FL that is disposed inside the housing, reduces incident laser light LB at a predetermined magnification, condenses laser light LB, and forms an image at a predetermined focal point. Further, optical axis deviation detector 16 is disposed inside housing 15*a* (see FIG. 2). The structure and function of optical axis deviation detector 16 will be described later.

Further, condensing optical unit 15 includes connector 15*b*, and transmission fiber 30 is connected to connector 15*b*. Furthermore, connector 15*b* retains quartz block 15*c* (see FIG. 2) provided in contact with the incident end of transmission fiber 30. Quartz block 15*c* has a function of optically coupling laser light to transmission fiber 30 and protecting the incident end of transmission fiber 30.

With such a configuration of laser oscillator 12, it is possible to obtain laser machining apparatus 100 having a large output power in which an output power of laser light LB exceeds several kW. Further, laser oscillator 12 is supplied with power from power supply 50 to perform laser oscillation, and laser light LB is emitted from the emission end of transmission fiber 30. Note that in the present exemplary embodiment, four laser modules 13 are mounted on laser oscillator 12, but the present invention is not particularly limited thereto. The number of laser modules 13 to be mounted can be appropriately changed according to output specifications required for laser machining apparatus 100 and output specifications of each of laser modules 13. Note that in the present exemplary embodiment, beam parameter product (BPP) representing the beam quality of laser light LB is about 4, and laser light LB includes a plurality of mode components.

Transmission fiber 30 is optically coupled to quartz block 15*c* in connector 15*b* attached to housing 15*a* of condensing optical unit 15, and transmits laser light LB received from laser oscillator 12 via condensing lens FL to laser processing head 40. Further, transmission fiber 30 includes core 31 for transmitting laser light LB to an axial center, and cladding 32 provided coaxially with core 31 on an outer circumferential side of core 31 (see FIG. 2). Note that, although core 31 and cladding 32 are made of quartz, it is configured that a refractive index of cladding 32 is lower than a refractive index of core 31, and cladding 32 has a function of confining laser light LB in core 31. Further, an outer circumferential surface of cladding 32 is covered with a film (not illustrated) for protecting transmission fiber 30 from mechanical damage.

Laser processing head 40 illuminates laser light LB transmitted by transmission fiber 30 toward an outside. Further, an optical component (not illustrated), for example, a collimator lens, a condensing lens, a protective glass, and the like are provided inside laser processing head 40. For example, in laser machining apparatus 100 illustrated in FIG. 1, laser light LB is emitted toward workpiece W which is an object to be machined disposed at a predetermined position. In this way, workpiece W is subjected to laser machining.

Controller 20 controls laser oscillation of laser oscillator 12. Specifically, laser oscillation control of each of laser modules 13 is performed by supplying a control signal such as an output voltage and an ON time to power supply 50 connected to laser oscillator 12. It is also possible to individually perform the laser oscillation control on each of laser modules 13. For example, a laser oscillation output power, the ON time, and the like may be different for each of laser modules 13.

Further, controller 20 drives actuators ACT1, ACT2 on the basis of a detection result in optical axis deviation detector 16 to displace reflection mirrors M1, M2. Specifically, angles of reflection mirrors M1, M2 with respect to optical axis LA (see FIG. 2) of the laser light are changed. This will be described later. Furthermore, in a case where laser processing head 40 is attached to a manipulator (not illustrated), controller 20 may control an operation thereof.

As described above, power supply 50 supplies power for performing the laser oscillation to the laser oscillator 12, specifically, to each of the plurality of laser modules 13. The power supplied to each of laser modules 13 may be differentiated by a command from controller 20. Further, power supply 50 may supply power to a movable unit of laser machining apparatus 100, for example, the manipulator described above, or power may be supplied to the movable unit of laser machining apparatus 100 from another power supply (not illustrated).

Note that laser machining apparatus 100 may include a display (not illustrated). The display may display each parameter at the time of laser machining, for example, a setting value or an actual output power of laser light LB. Further, when an abnormality occurs in each component part of laser machining apparatus 100, the display may display an abnormal part.

[Internal Disposition of Laser Apparatus and Configuration of Optical Axis Deviation Detector]

Figure 2:
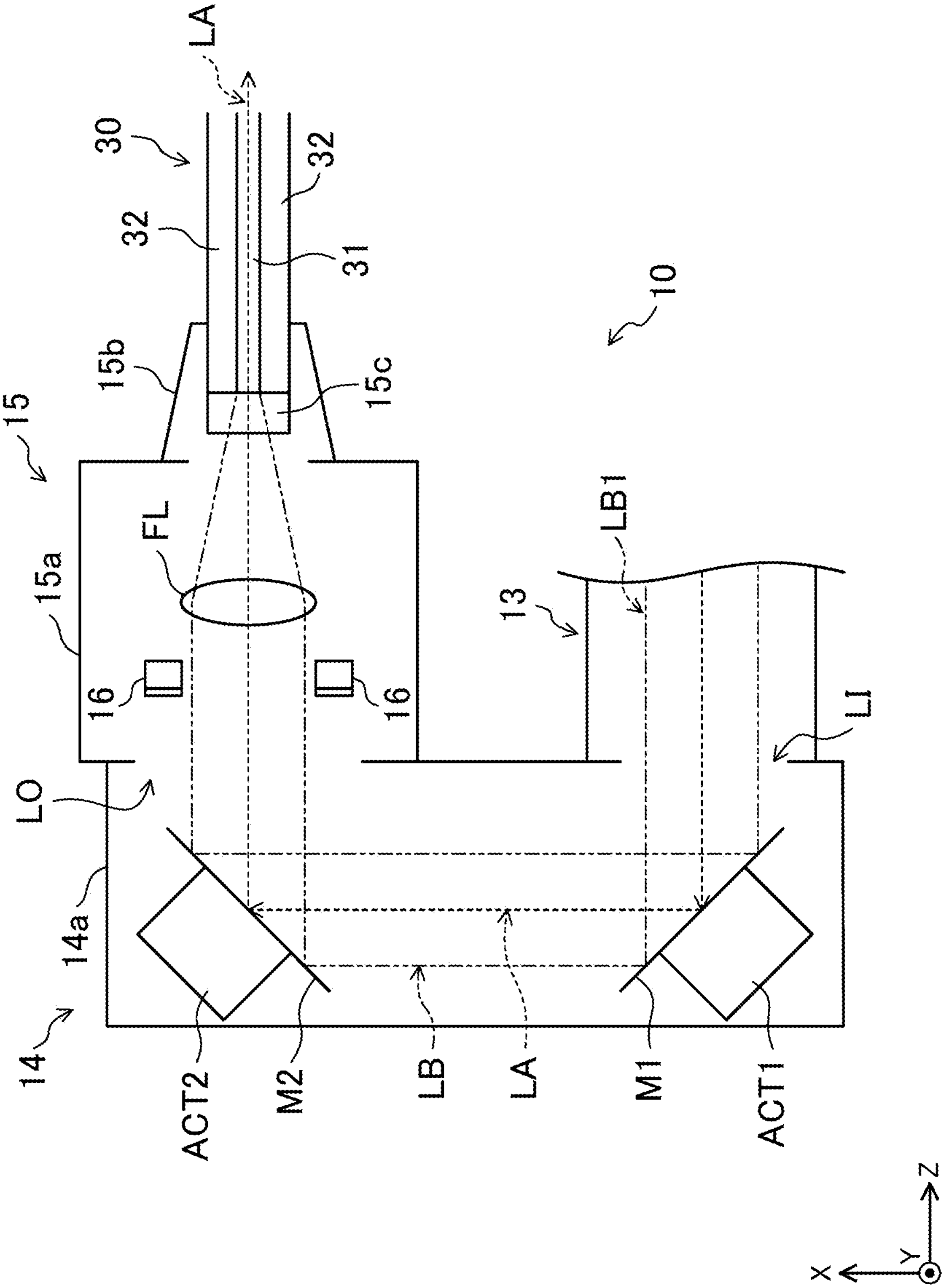
FIG. 2 is a schematic diagram illustrating a disposition of a main part of a laser apparatus.
Figure 3:
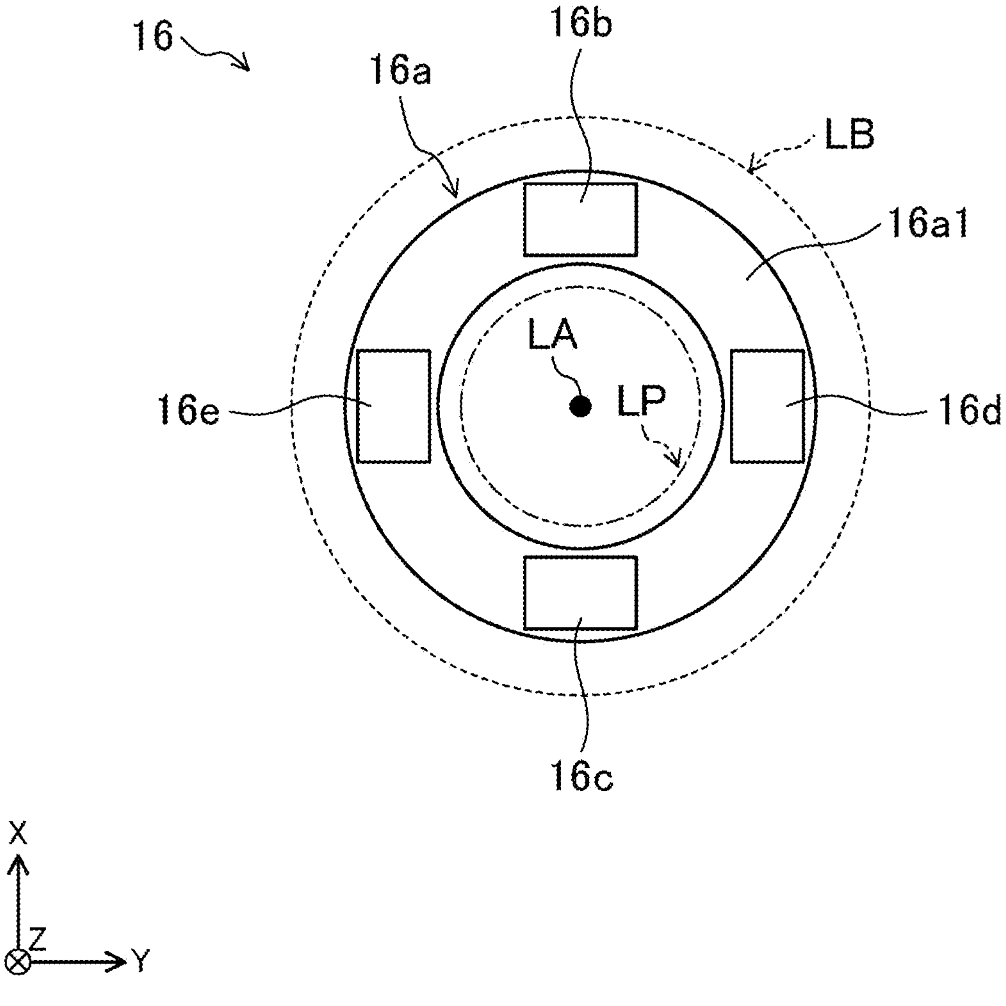
FIG. 3 is a schematic diagram illustrating an outline of an optical axis deviation detector.

FIG. 2 schematically illustrates a disposition of a main part of the laser apparatus, and FIG. 3 is a schematic diagram of the optical axis deviation detector. Note that, for convenience of description, only reflection mirrors M1, M2 and actuators ACT1, ACT2 are illustrated as internal components of beam combiner 14 in FIG. 2, and illustration and description of components other than these are omitted. Further, only condensing lens FL and optical axis deviation detector 16 are illustrated as internal components of condensing optical unit 15, and illustration and description of components other than these are omitted. Furthermore, in FIG. 3, illustration of wiring connecting first to fourth photodetectors 16*b* to 16*e* and controller 20 is omitted.

Module laser light LB1 emitted from one laser module 13 enters an inside from laser light incident port LI of beam combiner 14, is reflected by reflection mirrors M1, M2, and is emitted from laser light emission port LO of beam combiner 14. Furthermore, actuators ACT1, ACT2 are coupled to reflection mirrors M1, M2, respectively, and reflection mirrors M1, M2 are displaced on the basis of output signals of first to fourth photodetectors 16*b* to 16*e* to be described later. Specifically, the angles of reflection mirrors M1, M2 with respect to optical axis LA of laser light LB are changed. Note that actuators ACT1, ACT2 are piezoelectric actuators on which piezoelectric elements (not illustrated) are mounted.

Note that, although not illustrated, module laser lights emitted from the other three laser modules 13 are also reflected by reflection mirrors (not illustrated) provided inside beam combiner 14, and emitted from laser light emission port LO of beam combiner 14. Further, a piezoelectric actuator (not illustrated) is connected to each of these reflection mirrors.

Inside the beam combiner 14, the respective module laser lights are coupled to one laser light LB, and the laser light LB is incident on condensing lens FL as collimated light. In converting laser light LB into collimated light, a collimating lens (not illustrated) may be provided inside beam combiner 14, or a collimating lens (not illustrated) may be provided between laser light emission port LO of beam combiner 14 and optical axis deviation detector 16. Note that, in converting laser light LB into collimated light, a collimating lens may not be used. For example, laser light LB may be converted into collimated light by previously setting a curvature of a reflection mirror that reflects each module laser light to a desired value.

Further, inside condensing optical unit 15, the optical axis deviation detector 16 is disposed between the laser light incident port of condensing optical unit 15 communicating with laser light emission port LO of beam combiner 14 and condensing lens FL, and optical axis deviation detector 16 is attached and fixed to housing 15*a* of condensing optical unit 15.

Optical axis deviation detector 16 includes annular aperture 16*a* and first to fourth photodetectors 16*b* to 16*e* provided on first surface 16*a*1 facing a traveling direction of laser light LB among surfaces of aperture 16*a*. Note that, in a state where optical axis LA of laser light LB is adjusted to pass through core 31 of transmission fiber 30, optical axis LA of laser light LB is set to pass through a center of aperture 16*a*.

First and second photodetectors 16*b*, 16*c* are provided at positions facing each other in the X-direction in first surface 16*a*1 with the center of the aperture 16*a*, in other words, optical axis LA of laser light LB interposed therebetween, and third and fourth photodetectors 16*d*, 16*e* are provided at positions facing each other in the Y-direction with optical axis LA of laser light LB interposed therebetween. Each of first to fourth photodetectors 16*b* to 16*e* is connected to controller 20 via a wiring (not illustrated), and each output signal is input to controller 20.

As illustrated in FIG. 3, an inner diameter of aperture 16*a* is set to be larger than a diameter of optical path LP of laser light LB, in other words, a diameter of an area through which a mode component necessary for machining in laser light LB passes. On the other hand, first to fourth photodetectors 16*b* to 16*e* are disposed outside optical path LP of laser light LB, respectively.

[Procedure for Correcting Optical Axis Deviation of Laser Light]

A temperature rise in laser apparatus 10 due to laser oscillation for a long time, vibration of an ambient environment, and the like may cause positional deviation of optical components in laser apparatus 10. In such a case, when optical axis LA of laser light LB deviates from the center of the aperture 16*a* by a predetermined distance or more, laser light LB partially protrudes from core 31 of transmission fiber 30 and enters cladding 32, and cladding 32 may be damaged.

Therefore, in laser apparatus 10 illustrated in the present exemplary embodiment, the optical axis deviation of laser light LB is corrected based on a detection result of optical axis deviation detector 16, in other words, output signals of first to fourth photodetectors 16*b* to 16*e*.

Specifically, the optical axis deviation of the laser light is corrected by the following procedure.

First, when optical axis LA of laser light LB deviates from the center of the aperture 16*a* by a predetermined distance or more, optical path LP of laser light LB comes close to (approaches) any one of first to fourth photodetectors 16*b* to 16*e*. In this case, the output signal of the photodetector to which optical path LP of laser light LB is close becomes large. When the output signal exceeds a predetermined threshold value, controller 20 drives one or both of actuators ACT1, ACT2 coupled to reflection mirrors M1, M2 to change the angles of the reflection mirrors M1, M2 such that optical axis LA of laser light LB passes through the center of the aperture 16*a*.

More specifically, controller 20 stores data in which a deviation amount of optical axis LA of laser light LB and output ranges of first to fourth photodetectors 16*b* to 16*e* are associated in advance, and drives actuators ACT1, ACT2 to change the angles of reflection mirrors M1, M2 so that the output ranges of first to fourth photodetectors 16*b* to 16*e* fall within a predetermined allowable range.

Note that the above data may not be stored inside controller 20. The data may be outside controller 20 and read by controller 20 according to a command from controller 20.

[Effects and the Like]

As described above, laser apparatus 10 according to the present exemplary embodiment includes at least laser oscillator 12 that emits laser light LB, reflection mirrors (optical path changing components) M1, M2 that are disposed on optical path LP of laser light LB and change optical path LP of laser light LB, actuators ACT1, ACT2 that are coupled to reflection mirrors M1, M2 and displace reflection mirrors M1, M2, optical axis deviation detector 16 that is disposed to surround optical path LP of laser light LB and detects the optical axis deviation of laser light LB, and controller 20 that drives actuators ACT1, ACT2 on the basis of the detection result of optical axis deviation detector 16 to displace reflection mirrors M1, M2 and correct the optical axis deviation of laser light LB.

According to the present exemplary embodiment, the optical axis deviation of laser light LB can be corrected with a simple configuration. Further, by disposing optical axis deviation detector 16 so as to surround optical path LP of laser light LB, it is possible to detect the optical axis deviation of laser light LB without interfering with a mode component necessary for machining in laser light LB, and the quality of laser light LB used for actual machining or the like is not deteriorated.

Furthermore, optical axis deviation detector 16 includes an annular aperture **16*a* and first to fourth photodetectors 16*b* to 16*e* provided on first surface 16*a*1 of aperture 16*a* facing the traveling direction of laser light LB at predetermined intervals. First and second photodetectors 16*b*, 16*c* are provided at positions facing each other in the X-direction in first surface 16*a*1 with optical axis LA of laser light LB interposed therebetween, and third and fourth photodetectors 16*d*, 16*e* are provided at positions facing each other in the Y-direction with optical axis LA of laser light LB interposed therebetween. Each of first to fourth photodetectors 16*b* to 16*e* is connected to controller 20 via a wiring (not illustrated), and each output signal is input to controller 20**.

With such a configuration of optical axis deviation detector 16, it is possible to accurately correct the optical axis deviation of laser light LB. For example, by disposing first and second photodetectors **16*b*, 16*c* as described above, it is possible to detect in which direction optical axis LA of laser light LB deviates from the center of aperture 16*a* along the X-direction. Similarly, by disposing third and fourth photodetectors 16*d*, 16*e* as described above, it is possible to detect in which direction optical axis LA of laser light LB deviates from the center of aperture 16*a*** along the Y-direction. As a result, it is possible to accurately detect in which direction optical axis LA of laser light LB deviates and correct the optical axis deviation.

It is preferable that the deviation amount of optical axis LA of laser light LB and the output ranges of first to fourth photodetectors **16*b* to 16*e* are associated in advance, and controller 20 drives actuators ACT1, ACT2 to change the angles of reflection mirrors M1, M2 so that the output ranges of first to fourth photodetectors 16*b* to 16*e*** fall within a predetermined allowable range.

In this way, it is possible to accurately correct the optical axis deviation of laser light LB according to the output signals of first to fourth photodetectors **16*b* to 16*e***.

Optical axis deviation detector 16 is preferably disposed between the laser light incident port of condensing optical unit 15 and condensing lens FL.

By disposing optical axis deviation detector 16 in this manner, the optical axis deviation of laser light LB can be easily corrected.

Further, actuators ACT1, ACT2 are preferably piezoelectric actuators, and the use of the piezoelectric actuators can increase a response speed at which reflection mirrors M1, M2 are displaced. Furthermore, an optical path length of laser light LB is sufficiently longer than a spot diameter of laser light LB transmitted through condensing lens FL. Therefore, a displacement amount of reflection mirrors M1, M2, that is, an angle change amount may be small, and it is not necessary to use a large actuator such as an electric motor, and it is possible to suppress the increase in size of laser apparatus 10.

Further, laser oscillator 12 includes at least a plurality of laser modules 13, beam combiner 14 that couples module laser lights respectively emitted from the plurality of laser modules 13 and emits the module laser lights as laser light LB, and condensing optical unit 15 including condensing lens FL that reduces laser light LB emitted from beam combiner 14 at a predetermined magnification and condenses the laser light. Reflection mirrors (optical path changing components) M1, M2 are disposed inside beam combiner 14.

By configuring laser oscillator 12 in this manner, laser light LB having a large output power can be obtained. Further, by providing the plurality of reflection mirrors including reflection mirrors M1, M2 which are optical path changing components inside beam combiner 14, multiple module laser lights can be combined into one laser light LB.

Laser machining apparatus 100 according to the present exemplary embodiment includes at least laser apparatus 10, transmission fiber 30 that transmits laser light LB emitted from laser apparatus 10, and laser processing head 40 that is attached to the emission end of transmission fiber 30 and illuminates laser light LB toward workpiece W.

With such a configuration of laser machining apparatus 100, optical axis LA of laser light LB can be matched with core 31 of transmission fiber 30, and a machining point of workpiece W can be accurately illuminated with laser light LB, so that the machining quality of workpiece W can be improved. Further, since optical axis LA of the laser light can be accurately aligned with core 31 of transmission fiber 30, damage to transmission fiber 30 can be suppressed.

<First Modification>

Figure 4:
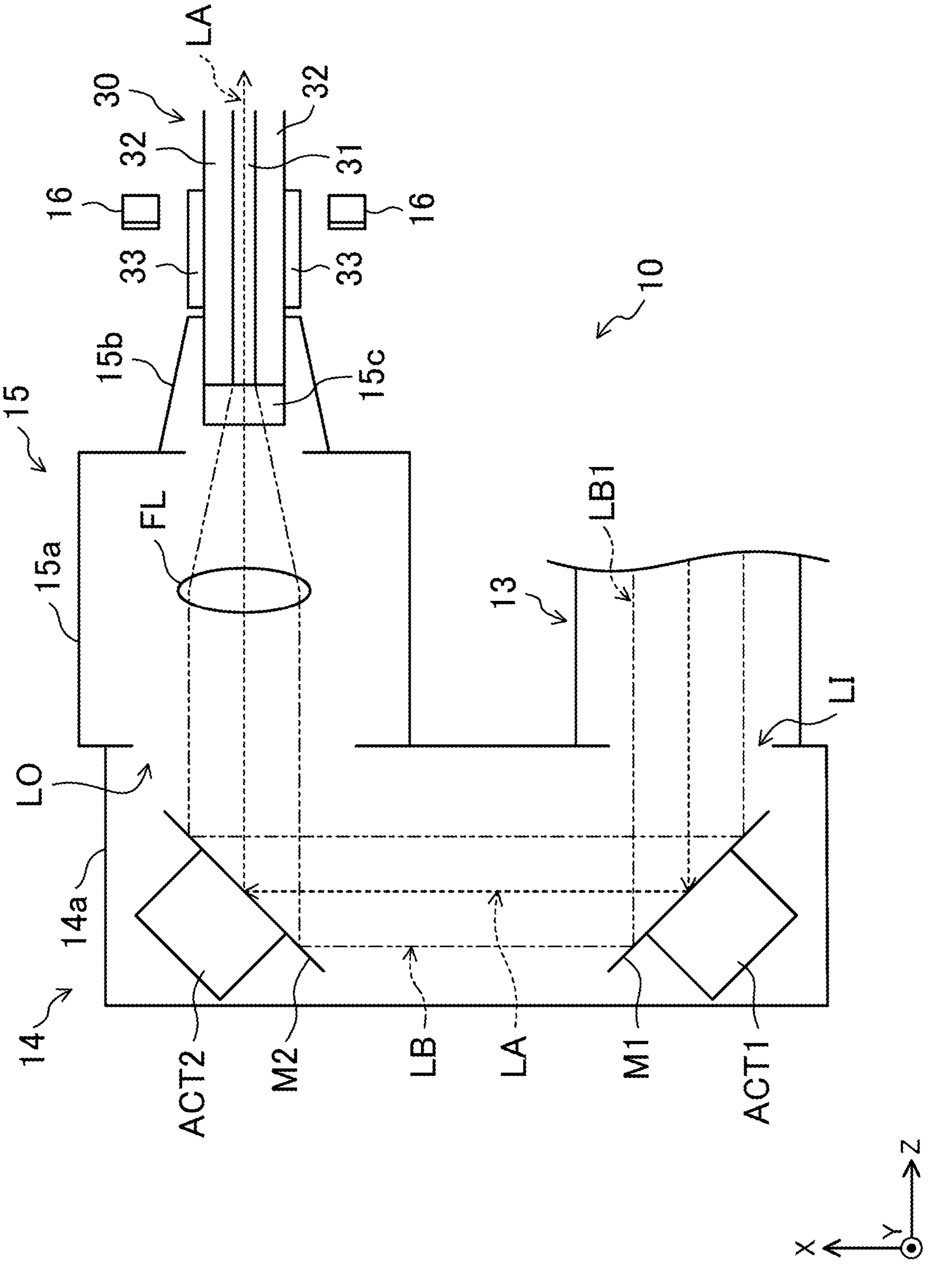
FIG. 4 is a schematic diagram illustrating a disposition of a main part of a laser apparatus according to a first modification.

FIG. 4 schematically illustrates a disposition of a main part of a laser apparatus according to the present modification. Note that in FIG. 4, the same parts as those in the first exemplary embodiment are denoted by the same reference marks, and the detailed description thereof will be omitted.

A configuration according to the present modification is different from the configuration illustrated in the first exemplary embodiment in that optical axis deviation detector 16 is disposed outside condensing optical unit 15. Further, transmission fiber 30 includes mode stripper 33 in the vicinity of the incident end, that is, in the vicinity of a connection part with condensing optical unit 15, and optical axis deviation detector 16 is disposed so as to surround the periphery of mode stripper 33. Note that, although not illustrated, mode stripper 33 is also provided in the vicinity of the emission end of transmission fiber 30.

Mode stripper 33 will now be described. Transmission fiber 30 often includes mode stripper 33 in the vicinity of the incident end and in the vicinity of the emission end. Mode stripper 33 is a mechanism for removing leakage light that does not propagate through core 31 and enters cladding 32 out of laser light LB entering transmission fiber 30. When mode stripper 33 is not provided, laser light LB incident on cladding 32 propagates through cladding 32, and laser light LB having a low beam quality is emitted from the emission end of transmission fiber 30. The detailed mechanism of mode stripper 33 varies depending on manufacturers who manufacture transmission fiber 30, but in principle, light incident on cladding 32 is converted into heat and removed without being totally reflected. At this time, the light incident on cladding 32 is lost by mode stripper 33, and most of the light does not propagate in cladding 32. Further, a part of the light propagating in cladding 32 is radiated to an outside of mode stripper 33.

In the present modification, by providing optical axis deviation detector 16 so as to surround the periphery of mode stripper 33, when any of first to fourth photodetectors 16*b* to 16*e* outputs a signal of a predetermined value or more, it can be determined that laser light LB is incident on cladding 32 by a predetermined amount or more. That is, it can be determined that optical axis LA of laser light LB deviates from core 31 of transmission fiber 30, and the optical axis deviation of laser light LB can be corrected based on the output signals of first to fourth photodetectors 16*b* to 16*e* as in the first exemplary embodiment.

<Second Modification>

Figure 5:
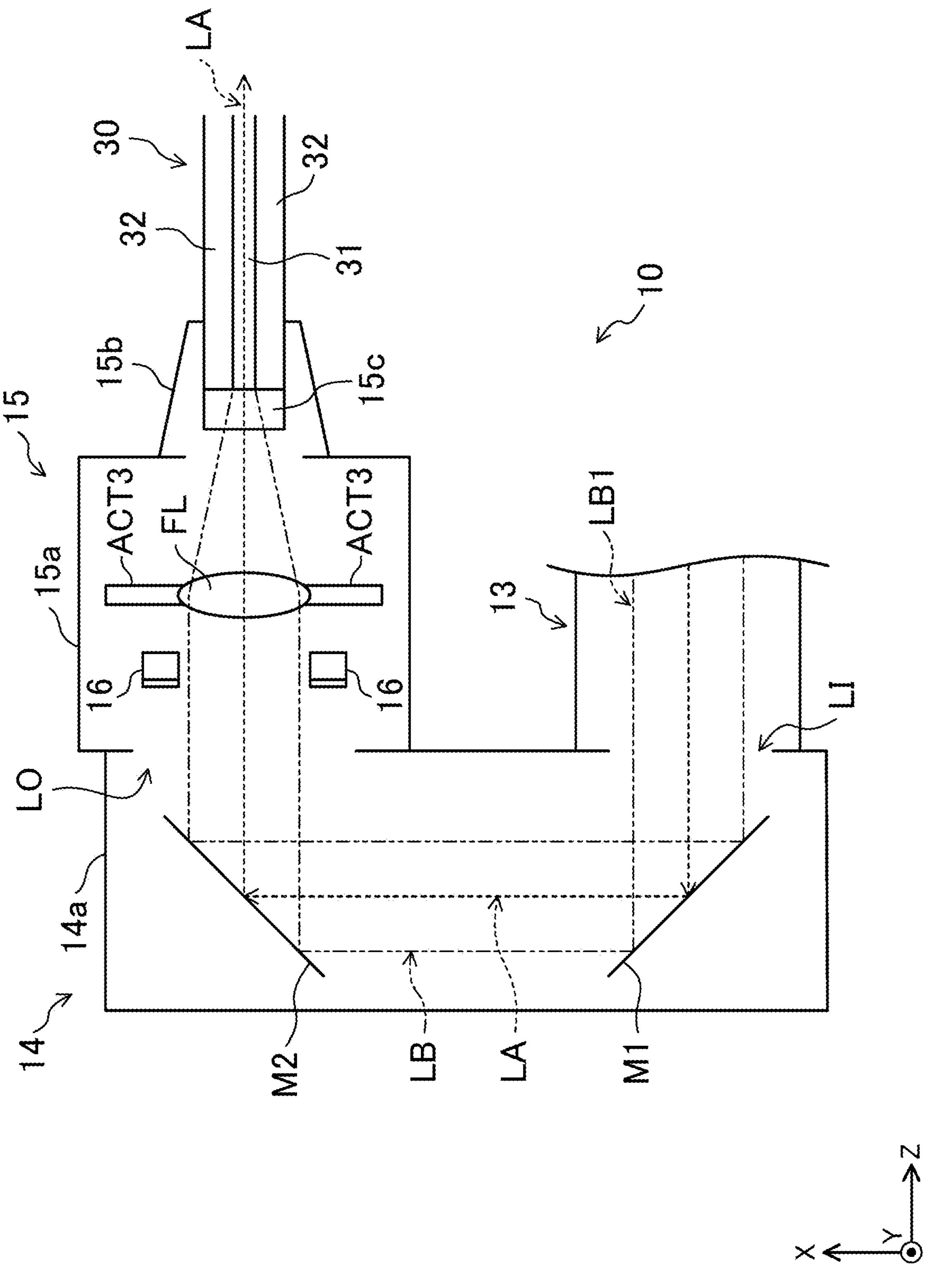
FIG. 5 is a schematic diagram illustrating a disposition of a main part of a laser apparatus according to a second modification.
Figure 6:
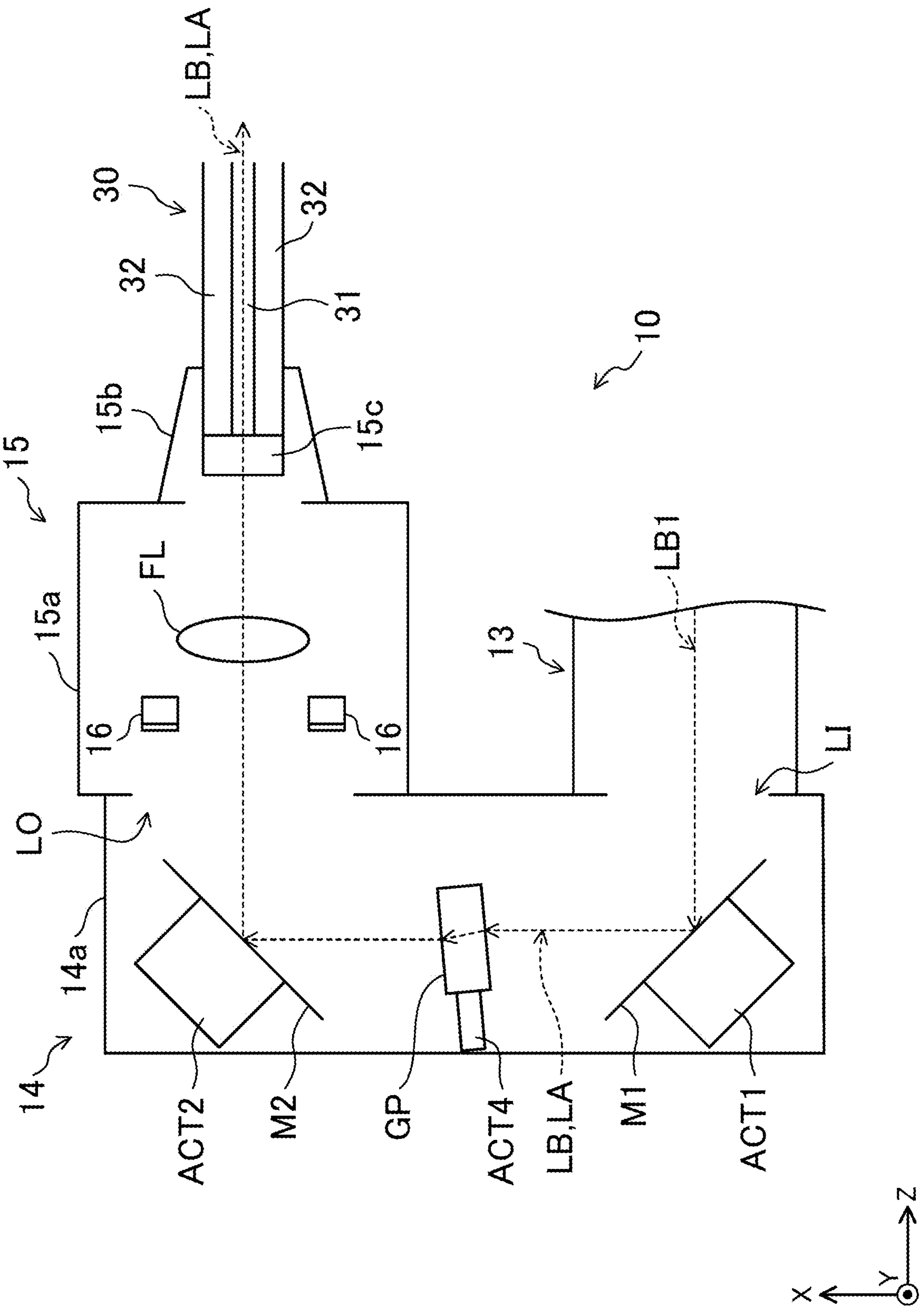
FIG. 6 is a schematic diagram illustrating a disposition of a main part of another laser apparatus according to the second modification.

FIG. 5 schematically illustrates a disposition of a main part of a laser apparatus according to the present modification, and FIG. 6 schematically illustrates a disposition of a main part of another laser apparatus. Note that, in FIGS. 5 and 6, the same parts as those in the first exemplary embodiment are denoted by the same reference marks, and detailed description thereof is omitted. In addition, for convenience of description, FIG. 6 illustrates only optical axis LA of laser light LB.

A configuration illustrated in FIG. 5 is different from the configuration illustrated in the first exemplary embodiment in that actuator ACT3 is connected to condensing lens FL. The optical axis deviation of laser light LB can also be corrected by controller 20 driving actuator ACT3 based on a detection result of optical axis deviation detector 16 to move condensing lens FL in a XY plane. However, in this case, it is necessary to pay attention so that a mode component of the laser light LB necessary for machining is not vignetted at a peripheral edge of condensing lens FL, and condensing lens FL is movable within a predetermined allowable range.

Further, a configuration illustrated in FIG. 6 is different from the configuration illustrated in the first exemplary embodiment in that parallel flat plate-shaped optical member GP connected to actuator ACT4 is disposed between reflection mirror M1 and reflection mirror M2. Optical member GP is made of quartz, transmits laser light LB, and has a refractive index larger than 1 with respect to a wavelength of laser light LB.

By disposing optical member GP at a position illustrated in FIG. 6, optical axis LA of laser light LB can be shifted by an amount corresponding to a refractive index and a thickness of optical member GP. Further, by driving actuator ACT4 to change an angle of optical member GP with respect to optical axis LA of laser light LB, laser light LB transmitted through optical member GP can be caused to travel while changing an angle from the initial traveling direction. As a result, effects similar to those of the first exemplary embodiment can be obtained.

In FIG. 6, optical member GP is disposed on the light of laser light LB between reflection mirror M1 and reflection mirror M2, but optical member GP may be disposed on the optical path of laser light LB between reflection mirror M2 and optical axis deviation detector 16. In this case, optical member GP may be disposed inside beam combiner 14 or may be disposed inside condensing optical unit 15.

Further, as is apparent from the above description, condensing lens FL and optical member GP correspond to the optical path changing component of the first exemplary embodiment. Note that ACT3, ACT4 are both piezoelectric actuators.

Second Exemplary Embodiment

Figure 7:
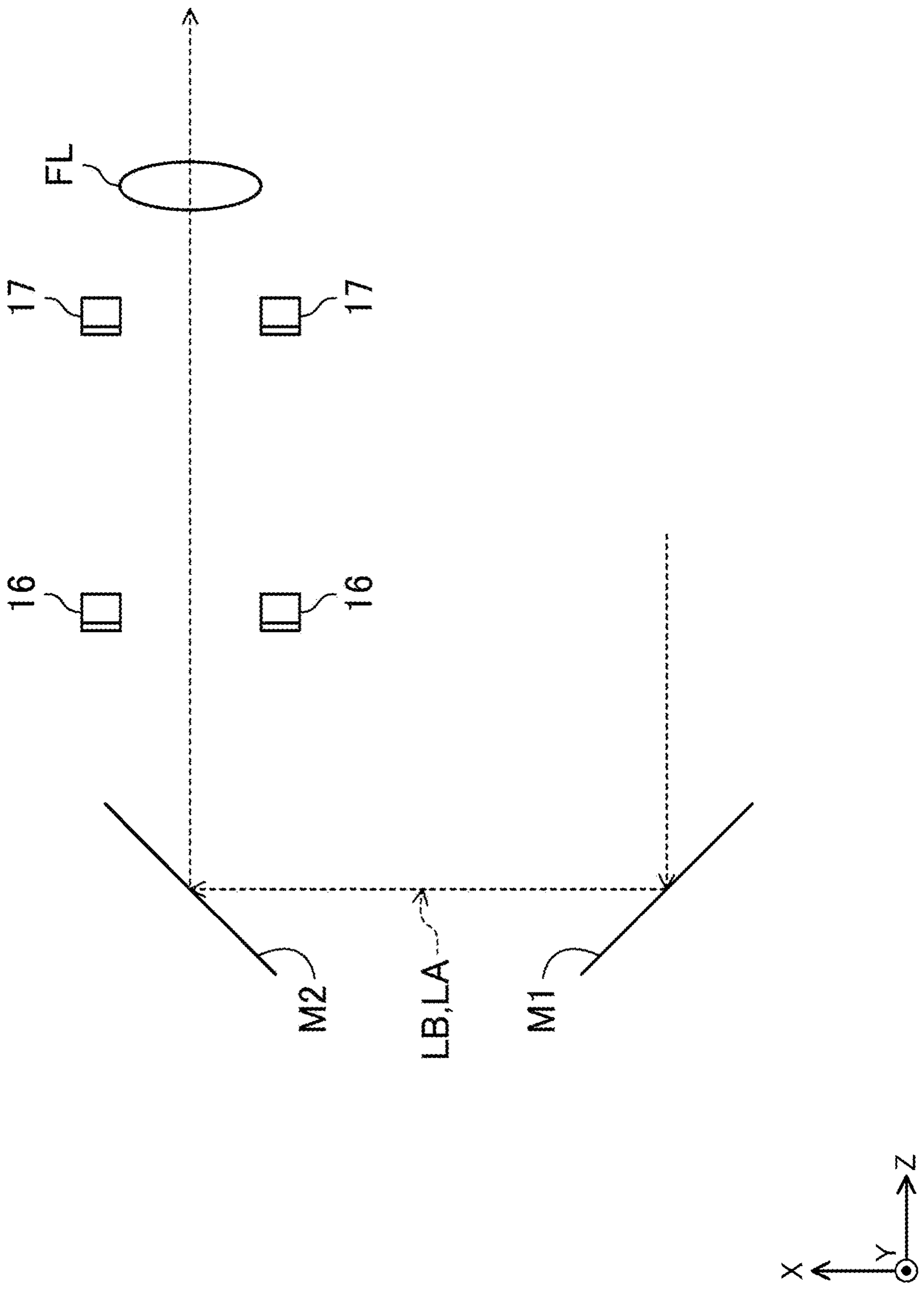
FIG. 7 is a schematic diagram illustrating a disposition of a main part of a laser apparatus according to a second exemplary embodiment of the present disclosure.
Figure 8:
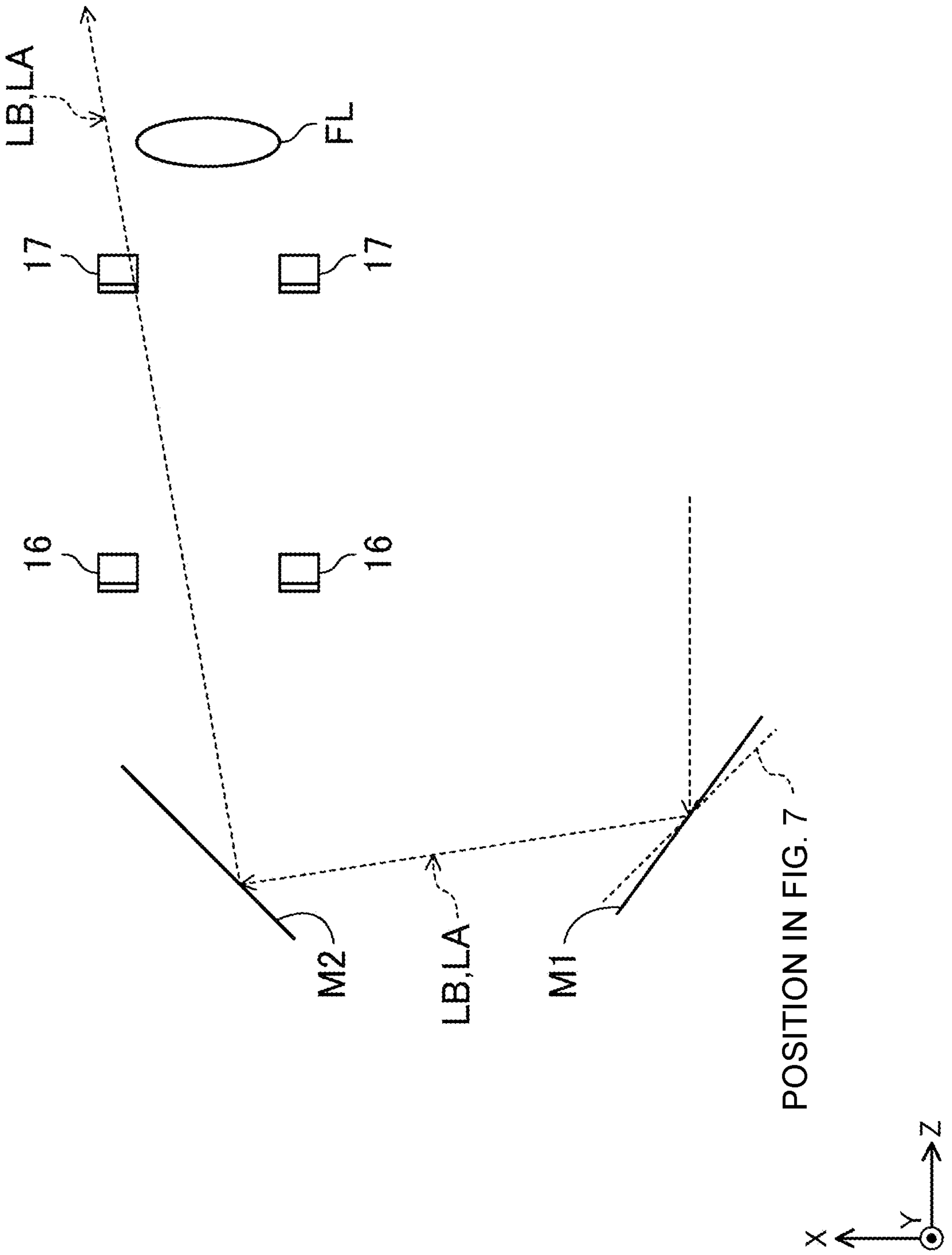
FIG. 8 is a schematic diagram illustrating a principle of detecting an optical axis deviation of laser light by a plurality of optical axis deviation detectors.

FIG. 7 schematically illustrates a disposition of a main part of a laser apparatus according to the present exemplary embodiment, and FIG. 8 is a schematic diagram illustrating a principle of detecting an optical axis deviation of laser light by a plurality of optical axis deviation detectors. Note that, in FIGS. 7 and 8, the same parts as those in the first exemplary embodiment are denoted by the same reference marks, and detailed description thereof is omitted. Further, for convenience of description, illustration and detailed description of component parts other than reflection mirrors M1, M2, optical axis deviation detectors 16, 17, and condensing lens FL are omitted. In addition, only optical axis LA of laser light LB is illustrated.

A configuration illustrated in the present exemplary embodiment is different from the configuration illustrated in the first exemplary embodiment in that two optical axis deviation detectors 16, 17 are provided on the optical path of laser light LB between reflection mirrors M1, M2 and condensing lens FL. Both of optical axis deviation detectors 16, 17 have the same structure as that illustrated in FIG. 3. Two optical axis deviation detectors 16, 17 are arranged at a predetermined interval along optical axis LA of laser light LB.

With such a configuration of laser apparatus 10, in a case where the optical axis deviation of laser light LB occurs due to a positional deviation of reflection mirrors M1, M2 as the optical path changing components, the optical axis deviation can be reliably detected and the correction can be performed. This will be further described with reference to FIG. 8.

When reflection mirrors M1, M2 are disposed at positions illustrated in FIG. 7, optical axis LA of laser light LB passes through the center of the aperture 16*a*, and enters condensing lens FL. On the other hand, as illustrated in FIG. 8, when reflection mirror M1 is disposed to be inclined from the position illustrated in FIG. 7, optical axis LA of laser light LB is inclined from a predetermined traveling direction according to the inclination. At this time, if the number of the optical axis deviation detectors arranged is one, this optical axis deviation may not be able to be detected. That is, in optical axis deviation detector 16 illustrated in FIG. 8, since optical axis LA of laser light LB passes through the inside of aperture 16*a*, the output signals of first to fourth photodetectors 16*b* to 16*e* may remain within an allowable range depending on the size of optical axis deviation detector 16 and a propagation condition of the laser light.

On the other hand, according to the present exemplary embodiment, when there is an optical axis deviation of optical axis LA of laser light LB, it is possible to correct the optical axis deviation and adjust optical axis LA to a desired position by disposing another optical axis deviation detector 17 at a subsequent stage of optical axis deviation detector 16, in this case, on a side closer to condensing lens FL.

Further, although not illustrated, a similar phenomenon can also occur when the angle of reflection mirror M2 deviates from a predetermined position. According to the present exemplary embodiment, also in this case, the optical axis deviation of laser light LB can be reliably detected. Furthermore, in a case where optical axis deviation detector 17 is disposed only at a position of the subsequent stage, there is a case where the optical axis deviation of laser light LB cannot be properly detected. However, according to the present exemplary embodiment, the optical axis deviation of laser light LB can be reliably detected.

The number of the optical axis deviation detectors is preferably set according to the number of the reflection mirrors which are optical path changing components connected to the actuator. However, when two optical axis deviation detectors 16, 17 are arranged at a predetermined interval along optical axis LA of laser light LB, it is possible to detect the optical axis deviation caused by the positional deviation or the like of each optical path changing component.

Note that, although FIG. 7 illustrates an example in which two optical axis deviation detectors 16, 17 are provided on the optical path of laser light LB between reflection mirror M2 and condensing lens FL, for example, one optical axis deviation detector 16 may be provided on the optical path of laser light LB between reflection mirror M2 and condensing lens FL, and another optical axis deviation detector 17 may be provided near the incident end of transmission fiber 30 so as to surround mode stripper 33.

Other Exemplary Embodiments

Note that the components illustrated in the first and second exemplary embodiments including the first and second modifications can be appropriately combined to form a new exemplary embodiment. For example, condensing lens FL illustrated in the second modification, which is coupled to actuator ACT3 and movable in the XY plane, may be applied to the configurations illustrated in the first and second exemplary embodiments.

Further, in the first exemplary embodiment, laser oscillator 12 including the plurality of laser modules 13 has been described as an example, but a single laser light source that emits laser light LB may be used. In this case, although the module laser lights are not coupled inside beam combiner 14, a plurality of reflection mirrors may be provided in housing 14*a* in order to change the optical path of laser light LB.

Furthermore, in the first and second exemplary embodiments including the first and second modifications, reflection mirrors M1, M2, condensing lens FL, and optical member GP have been described as examples of the optical path changing component, but components other than these components may be used. For example, a wedge plate that transmits laser light LB may be used instead of reflection mirrors M1, M2. Note that, unlike optical member GP, the wedge plate also includes a configuration in which two surfaces facing each other and transmitting laser light LB are not parallel. Note that the inside of beam combiner 14 is not particularly limited to the configuration illustrated in FIGS. 2 and 4 to 6, and may have another configuration.

Further, depending on a wavelength band of laser light LB, the optical member provided in contact with the incident end of transmission fiber 30 may be a member made of another material that transmits laser light LB, instead of quartz block 15*c*. In addition, the materials of core 31 and cladding 32 constituting transmission fiber 30 are not particularly limited to quartz, and can be appropriately changed depending on the wavelength band of laser light LB.

INDUSTRIAL APPLICABILITY

Since the laser apparatus of the present disclosure can correct the optical axis deviation of the laser light with a simple configuration, the laser apparatus of the present disclosure is useful for application to a laser machining apparatus or the like using laser light having a large output power.

REFERENCE MARKS IN THE DRAWINGS

10: laser apparatus
12: laser oscillator
13: laser module
14: beam combiner
15: condensing optical unit
16, 17: optical axis deviation detector
16*a*: aperture
16*a*1: first surface of aperture 16*a*
16*b* to 16*e*: first to fourth photodetectors
20: controller
30: transmission fiber
31: core
32: cladding
33: mode stripper
40: laser processing head
50: power source
100: laser machining apparatus
ACT1, ACT2, ACT3, ACT4: actuator
FL: condensing lens (optical path changing component)
GP: optical member (optical path changing component)
LA: optical axis of laser light LB
LB: laser light
M1, M2: reflection mirror (optical path changing component)
W: workpiece

The invention claimed is:

1. A laser apparatus comprising:

a laser oscillator configured to omit laser light;

an optical path changing component disposed on an optical path of the laser light and configured to change the optical path of the laser light;

an actuator coupled to the optical path changing component and configured to displace the optical path changing component;

an optical axis deviation detector surrounding the optical path of the laser light and configured to detect an optical axis deviation of the laser light from an optical axis of the optical path; and a controller configured to drive the actuator based on a detection result of the optical axis deviation detector to displace the optical path changing component and thereby correct the optical axis deviation of the laser light, wherein the optical axis deviation detector includes:

an annular aperture; and a plurality of photodetectors on a first surface of the aperture at predetermined intervals, the first surface facing a traveling direction of the laser light, wherein an inner diameter of the annular aperture is larger than a diameter of an area through which a mode component of the laser light necessary for machining passes, and each of the plurality of photodetectors is disposed outside the area, and wherein the optical axis deviation detector is configured to detect the optical axis deviation of the laser light by detecting magnitudes of output signals transmitted from the plurality of photodetectors, and by determining whether the magnitudes of the output signals indicate that the optical path of the laser light has approached one or more of the plurality of photodetectors of the optical axis deviation detector.

2. The laser apparatus according to claim 1, wherein the plurality of photodetectors includes a first photodetector and a second photodetector respectively provided at positions facing each other in a first direction in the first surface with an optical axis of the laser light interposed between the first photodetector and the second photodetector, and a third photodetector and a fourth photodetector respectively provided at positions facing each other in a second direction substantially orthogonal to the first direction with the optical axis of the laser light interposed between the third photodetector and the fourth photodetector.

3. The laser apparatus according to claim 1, wherein:

a deviation amount of the optical axis of the laser light and an output range of each of the plurality of photodetectors are associated in advance, and the controller is configured to drive the actuator to displace the optical path changing component, and to keep the output range of each of the plurality of photodetectors within a predetermined allowable range.

4. The laser apparatus according to claim 1, wherein:

the laser oscillator includes at least a plurality of laser modules, a beam combiner configured to couple module laser beams respectively emitted from the plurality of laser modules and emit the coupled module laser beams as the laser light, and a condensing optical unit including a condensing lens configured to reduce the laser light emitted from the beam combiner at a predetermined magnification and condense the laser light, and the optical path changing component is disposed in at least one of an inside of the beam combiner and an inside of the condensing optical unit.

5. The laser apparatus according to claim 4, wherein the optical axis deviation detector is disposed between a laser light incident port of the condensing optical unit and the condensing lens.

6. The laser apparatus according to claim 4, wherein:

the condensing optical unit is connected to a transmission fiber to transmit the laser light, the transmission fiber has a mode stripper near a connection with the condensing optical unit, and the optical axis deviation detector surrounds the mode stripper.

7. The laser apparatus according to claim 1, wherein:

the optical path changing component is one of a plurality of optical path changing components on the optical path of the laser light, and the optical axis deviation detector is one of a plurality of optical axis deviation detectors arranged at predetermined intervals along the optical axis of the laser light according to a number of the plurality of the optical path changing components coupled to the actuator.

8. The laser apparatus according to claim 7, wherein each of the plurality of optical path changing components comprises at least one of:

a reflection mirror configured to reflect in a predetermined direction the laser light inputted, a lens configured to shape the laser light inputted into a predetermined shape, and a parallel flat plate having a refractive index larger than 1 with respect to the laser light and configured to transmit the laser light.

9. The laser apparatus according to claim 1, wherein the actuator is a piezoelectric actuator.

10. A laser machining apparatus comprising:

the laser apparatus according to claim 1;

a transmission fiber configured to transmit the laser light emitted from the laser apparatus; and a laser processing head attached to an emission end of the transmission fiber and configured to illuminate the laser light toward a workpiece.

* * * * *